(12) United States Patent
Chung

(10) Patent No.: US 7,379,145 B2
(45) Date of Patent: May 27, 2008

(54) IN-PLANE SWITCHING MODE LIQUID CRYSTAL DISPLAY DEVICE AND METHOD OF FABRICATING THE SAME

(75) Inventor: Jin-Youl Chung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 349 days.

(21) Appl. No.: 11/304,543

(22) Filed: Dec. 16, 2005

(65) Prior Publication Data

US 2006/0092364 A1 May 4, 2006

Related U.S. Application Data

(62) Division of application No. 10/670,424, filed on Sep. 26, 2003, now Pat. No. 7,006,186.

(30) Foreign Application Priority Data

Dec. 31, 2002  (KR)  ............... 10-2002-0088443

(51) Int. Cl.
*G02F 1/1368* (2006.01)
*G02F 1/139* (2006.01)

(52) U.S. Cl. ............... 349/141; 349/43; 349/111; 349/187

(58) Field of Classification Search ............ 349/42, 349/43, 110, 111, 122, 138, 141, 187; 257/59, 257/72; 345/92; 438/30
See application file for complete search history.

(56) References Cited

U.S. PATENT DOCUMENTS 5,345,324 A * 9/1994 Koseki et al. ............ 349/44
5,598,285 A 1/1997 Kondo et al.
5,838,037 A 11/1998 Masutani et al.
5,946,060 A 8/1999 Nishiki et al.
5,990,987 A 11/1999 Tanaka (Continued)

FOREIGN PATENT DOCUMENTS

JP 9-5764 1/1997

(Continued)

OTHER PUBLICATIONS

R. Kiefer et al., "In-Plane Switching of Nematic Liquid Crystals", Japan Display '92, pp. 547-550.

(Continued)

*Primary Examiner*—Toan Ton
*Assistant Examiner*—Tai Duong
(74) *Attorney, Agent, or Firm*—McKenna Long & Aldridge LLP

(57) ABSTRACT

An in-plane switching mode liquid crystal display device includes first and second substrates, a gate line and a data line arranged along first and second directions on the first substrate to define a pixel area, a passivation layer on the first substrate except within the pixel area, a light blocking system on the first substrate and on a stepped portion of the passivation layer adjacent to the data line, a plurality of common electrodes disposed within the pixel area, at least one of the common electrodes overlap a portion of the data line, and a plurality of pixel electrodes disposed within the pixel area, wherein the pixel electrodes and the common electrodes form a lateral electric field.

4 Claims, 9 Drawing Sheets

U.S. PATENT DOCUMENTS

| | | | |
|---|---|---|---|
| 6,028,653 A | 2/2000 | Nishida | |
| 6,097,454 A | 8/2000 | Zhang et al. | |
| 6,266,166 B1 | 7/2001 | Katsumata et al. | |
| 7,061,566 B2* | 6/2006 | Lee et al. | 349/141 |
| 2002/0063835 A1* | 5/2002 | Kim | 349/141 |

FOREIGN PATENT DOCUMENTS

JP    973101    3/1997

OTHER PUBLICATIONS

M. Ohta et al., Development of Super TFT-LCDs with In-Plane Switching Display Mode, Asia Display '95, pp. 717-710.

M. Oh-e, et al. "Principles and Characteristics of Electro-Optical Behaviour with In-Plane Switching Mode", Asia Display '95, pp. 577-580.

S. Matsumoto, et al., "Display Characteristics of In-Plane Switching (IPS) LCDs and a Wide-Viewing-Angle", Euro Display '96, pp. 445-448.

H. Wakemoto, et al., "An Advanced In-Plane Switching Mode FTF-LCD", Sid 97 Digest, pp. 929-932.

S.H. Lee, et al., "High-Transmittance, Wide-Viewing-Angle Nematic Liquid Crystal Display Controlled by Fringe-Field Switching", Asia Display 98, pp. 371-374.

* cited by examiner

IN-PLANE SWITCHING MODE LIQUID CRYSTAL DISPLAY DEVICE AND METHOD OF FABRICATING THE SAME

CROSS-REFERENCE TO RELATED APPLICATIONS

This application is a Divisional of application Ser. No. 10/670,424, filed Sep. 26, 2003 now U.S. Pat. No. 7,006,186; which claims priority to Korean Patent Application No. 10-2002-0088443, filed Dec. 31, 2002, all of which are hereby incorporated by reference as if fully set forth herein.

The present invention claims the benefit of Korean Patent Application No. 88443/2002 filed in Korea on Dec. 31, 2002, which is hereby incorporated by reference.

BACKGROUND OF THE INVENTION

1. Field of the Invention

The present invention relates to a liquid crystal display device, and particularly, to an in-plane switching mode liquid crystal display device and method of fabricating the same.

2. Description of the Related Art

In general, twisted nematic mode liquid crystal display (LCD) devices commonly used as flat panel display devices have advantages of high image quality and lower power consumption. However, twisted nematic mode LCD devices have disadvantages, such as narrow viewing angles, due to refractive anisotropy of liquid crystal molecules being oriented in parallel with a substrate along a nearly vertical direction to the substrate when the voltage is supplied to the liquid crystal display panel. Accordingly, in-plane switching mode LCD devices have been developed that can solve the viewing angle problems by orienting the liquid crystal molecules to be parallel with the substrate.

FIG. 1A is a plan view of a unit pixel of an in-plane switching mode LCD according to the related art, and FIG. 1B is a cross sectional view along I-I' of FIG. 1A according to the related art. In FIG. 1A, a gate line 1 and a data line 3 are arranged along transverse and longitudinal directions, respectively, on a transparent first substrate 10 (in FIG. 1B) to define a pixel area. In actuality, there are an n-number of nxm pixels by crossings of an n-number of gate lines 1 and an m-number of data lines 3 formed on the transparent first substrate 10. In addition, a thin film transistor 9 includes a gate electrode 1a, a semiconductor layer 5, and source and drain electrodes 2a and 2b disposed within the pixel area, wherein the gate electrode 1a is connected to the gate line 1, the source electrode 2a is connected to the data line 3, and the drain electrode 2b is connected to a pixel electrode 7. Moreover, a gate insulating layer 8 is formed on an entire surface of the transparent first substrate 10.

A common line 4 is arranged to be parallel with the gate line 1 within the pixel area, and at least a pair of common and pixel electrodes 6 and 7 for switching the liquid crystal molecules are arranged to be parallel with the data line 3. The common electrode 6 is simultaneously formed with the gate line 1 and is connected to the common line 4, whereas the pixel electrode 7 is simultaneously formed with the source and drain electrodes 2a and 2b and is connected to the drain electrode 2b of the thin film transistor 9.

In FIG. 1B, a passivation layer 11 and a first alignment layer 12a are formed along an entire surface of the transparent first substrate 10 including the source and drain electrodes 2a and 2b. It is desirable that the common electrode 6 is formed along an outer portion of the pixel area in order to shield any lateral electric fields generated between the pixel electrode 7 and the data line 3 formed along the outer portion of the pixel area. In addition, a pixel electrode line 14 is formed to overlap the common line 4 and is connected to the pixel electrode 7, thereby forming a storage capacitor with the gate insulating layer 8 therebetween.

A black matrix 21, which prevents light from leaking to the thin film transistor 9, the gate line 1, the data line 3, and a color filter 23 are formed on a second substrate 20, and a second alignment layer 12b is formed thereon. In addition, a liquid crystal layer 13 is formed between the first and second substrates 10 and 20. However, the in-plane switching mode LCD device of FIGS. 1A and 1B has a low aperture ratio since the common electrode 6 and the pixel electrode 7 are formed of opaque metals within the pixel area.

SUMMARY OF THE INVENTION

Accordingly, the present invention is directed to an in-plane switching mode liquid crystal display device and method of fabricating an in-plane switching mode liquid crystal display device that substantially obviates one or more of the problems due to limitations and disadvantages of the related art.

An object of the present invention is to provide an in-plane switching mode liquid crystal display device having an improved aperture ratio.

Another object of the present invention is to provide a method of fabricating an in-plane switching mode liquid crystal display device having an improved aperture ratio.

Another object of the present invention is to provide an in-plane switching mode liquid crystal display device having an improved brightness.

Another object of the present invention is to provide a method of fabricating an in-plane switching mode liquid crystal display device having an improved brightness.

Another object of the present invention is to provide an in-plane switching mode liquid crystal display device having an ability to prevent light leakage.

Another object of the present invention is to provide a method of fabricating an in-plane switching mode liquid crystal display device having an ability to prevent light leakage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes first and second substrates, a gate line and a data line arranged along first and second directions on the first substrate to define a pixel area, a passivation layer on the first substrate except within the pixel area, a light blocking system on the first substrate and on a stepped portion of the passivation layer adjacent to the data line, a plurality of common electrodes disposed within the pixel area, at least one of the common electrodes overlap a portion of the data line, and a plurality of pixel electrodes disposed within the pixel area, wherein the pixel electrodes and the common electrodes form a lateral electric field.

In another aspect, a method of fabricating an in-plane switching mode liquid crystal display device includes forming a gate line and a light blocking line on a first substrate, forming a data line on the first substrate to define a pixel area, forming a plurality of pixel electrodes within the pixel area to be parallel with the data line, forming an organic layer along an entire surface of the first substrate, exposing the pixel electrodes by removing a portion of the organic layer, and forming a plurality of common electrodes on the first substrate, wherein at least one of the common electrodes along an outer portion of the pixel area overlap the data line.

In another aspect, a method of fabricating an in-plane switching mode liquid crystal display device includes forming a gate line and a data line along first and second directions on a first substrate to define a pixel area, forming a passivation layer on the first substrate except within the pixel area, forming a light blocking system on the first substrate and on a stepped portion of the passivation layer adjacent to the data line, forming a plurality of common electrodes disposed within the pixel area, at least one of the common electrodes overlap a portion of the data line, and forming a plurality of pixel electrodes disposed within the pixel area, wherein the pixel electrodes and the common electrodes form a lateral electric field.

In another aspect, an in-plane switching mode liquid crystal display device includes a gate line and a light blocking line on a first substrate, a data line on the first substrate to define a pixel area, a plurality of pixel electrodes within the pixel area to be parallel with the data line, an organic layer along an entire surface of the first substrate except for the pixel electrodes, and a plurality of common electrodes on the first substrate, wherein at least one of the common electrodes is provided along an outer portion of the pixel area to overlap the data line.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 1A:
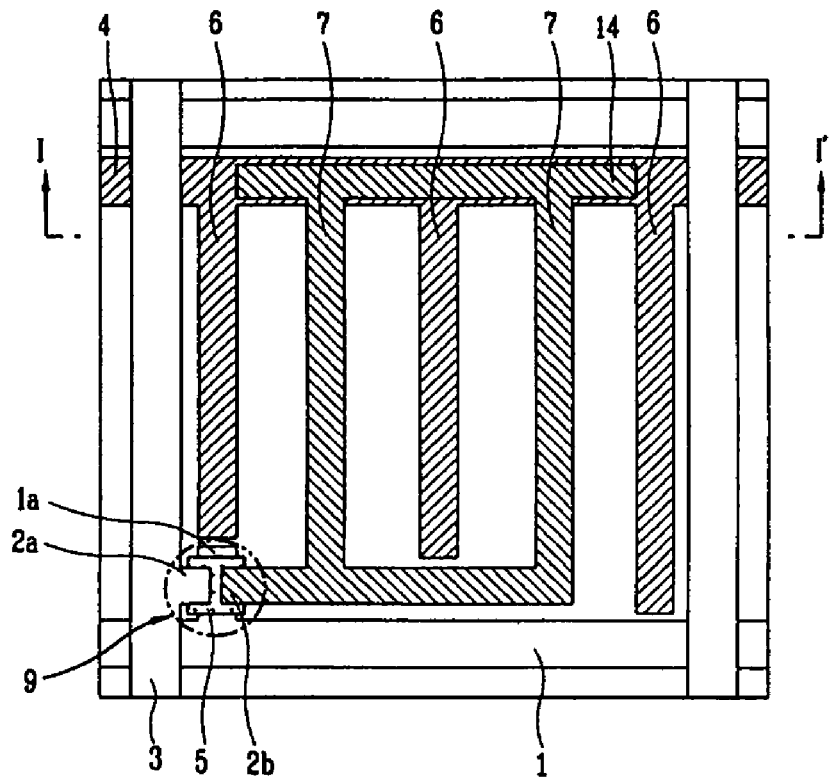
FIG. 1A is a plan view of a unit pixel of an in-plane switching mode LCD according to the related art.
Figure 1B:
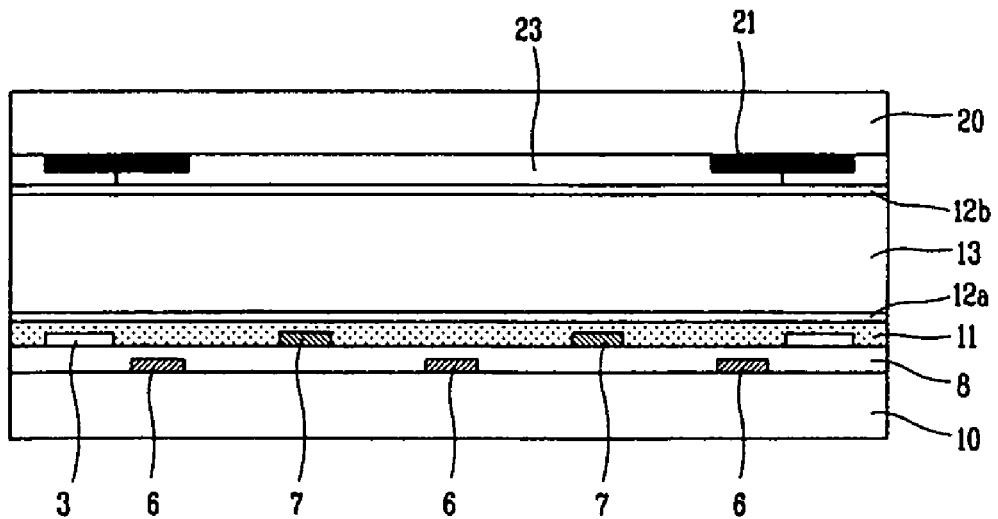
FIG. 1B is a cross sectional view along I-I' of FIG. 1A according to the related art.
Figure 2A:
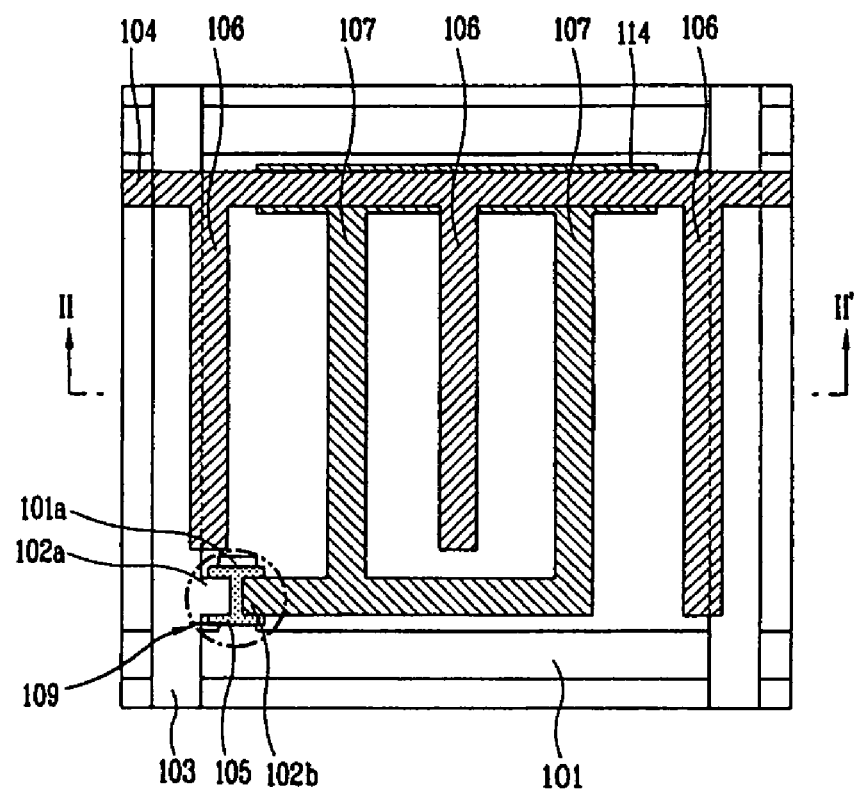
FIG. 2A is a plan view of an exemplary unit pixel of an in-plane switching mode LCD device according to the present invention.
Figure 2B:
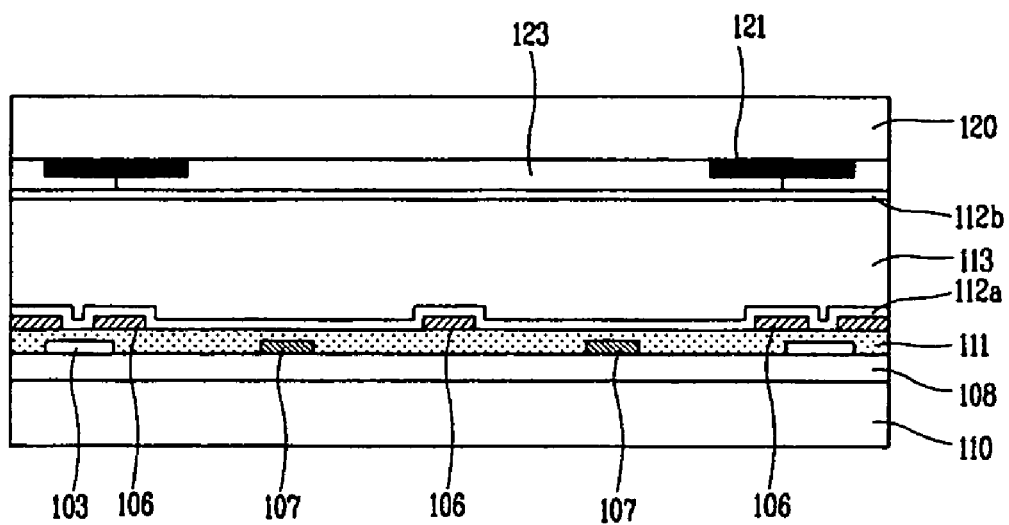
FIG. 2B is a cross sectional view along II-II' of FIG. 2A according to the present invention.

FIG. 2A is a plan view of an exemplary unit pixel of an in-plane switching mode LCD device according to the present invention, and FIG. 2B is a cross sectional view along II-II' of FIG. 2A according to the present invention. In FIG. 2A, a gate line 101 and a data line 103 may be arranged along transverse and longitudinal directions on a transparent first substrate 110 (in FIG. 2B) to define a pixel area, a common line 104 may be disposed to be parallel with the gate line 101, and a pixel electrode line 114 may be provided to overlap the common line 104. Accordingly, the common line 104 and the pixel electrode line 114 may form a storage capacitor using an organic passivation layer 111 (in FIG. 2B) applied along an entire surface of the transparent first substrate 110 as a capacitor dielectric. In addition, a thin film transistor 109 including a gate electrode 101a, a semiconductor layer 105, and source and drain electrodes 102a and 102b may be disposed at crossing area of the gate and data lines 101 and 103. Moreover, the gate electrode 101a may be connected to the gate line and the source electrode 102a may be connected to the data line 103, wherein the drain electrode 102b may be connected to pixel electrodes 107 that vertically branch from the pixel electrode line 114, and a gate insulating layer 108 (in FIG. 2B) may be deposited along an entire surface of the transparent first substrate 110.

In FIGS. 2A and 2B, the pixel electrodes 107 and the common electrodes 106, which may include transparent conductive material, such as ITO and IZO and may branch-vertically from the common line 104, may function to generate a lateral electric field within the pixel area, wherein each of the pixel electrodes 107 may be disposed to alternate with each of the common electrodes within the pixel area. Accordingly, portions of the common electrodes 106 disposed along outer portions of the pixel area may overlap with portions of the data line 103. In addition, a first alignment layer 112a may be formed along an entire surface of the transparent first substrate 110 including the common electrodes 106.

In FIG. 2B, a black matrix 121, which may prevent light from leaking into the thin film transistor 109 (in FIG. 2A), the gate line 101 (in FIG. 2A), the data line 103 (in FIG. 2A), and a color filter 123 may be formed on a transparent second substrate 120. In addition, a second alignment layer 112b may be formed on the color filter 123, and a liquid crystal layer 113 may be provided between the transparent first and second substrates 110 and 120.

Accordingly, since portions of the common electrode 106 may overlap portions of the data line 103 and may include the transparent conductive material, the light transmitting area of the pixel area may be increased. However, since the organic passivation layer 111 may overlap the common electrodes 106 and the data line 103, the light produced by a backlight device may be absorbed in the organic passivation layer 111 and image brightness on the display screen may be lowered.

Figure 3A:
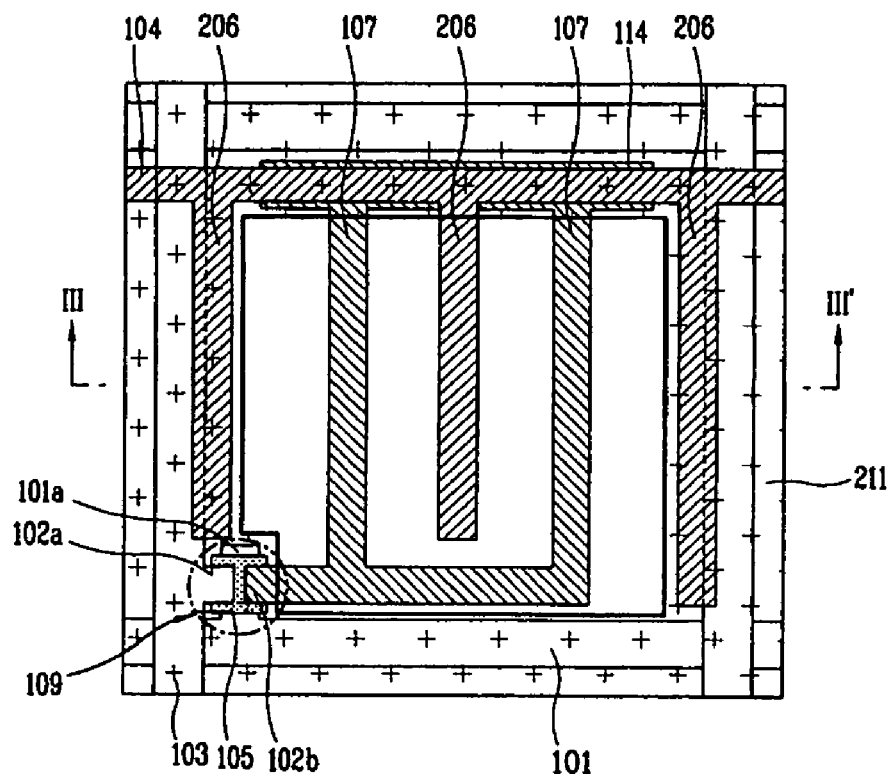
FIG. 3A is a plan view of another exemplary unit pixel of an in-plane switching mode LCD device according to the present invention.
Figure 3B:
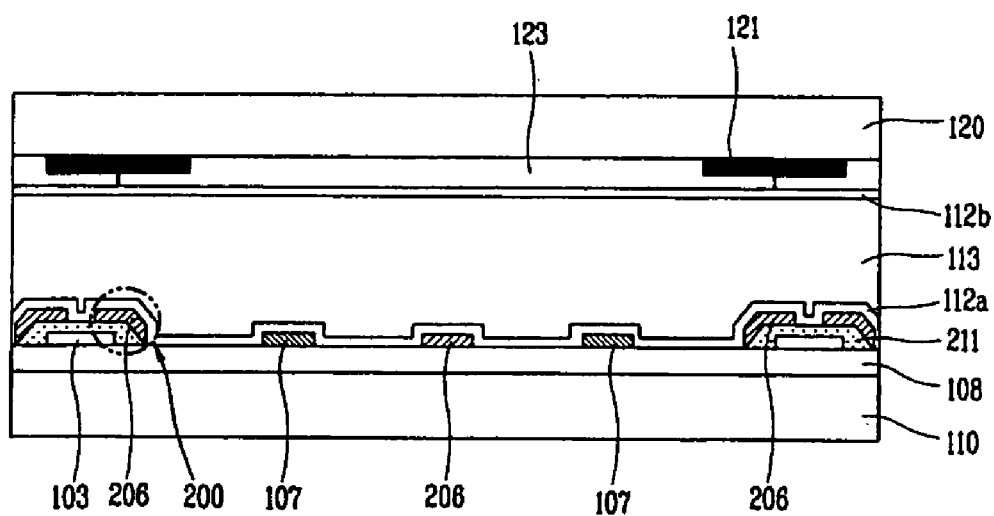
FIG. 3B is a cross sectional view along III-III' of FIG. 3A according to the present invention.

FIG. 3A is a plan view of another exemplary unit pixel of an in-plane switching mode LCD device according to the present invention, and FIG. 3B is a cross sectional view along III-III' of FIG. 3A according to the present invention. Since FIGS. 3A and 3B may include the same components as those of FIG. 2, except for the passivation layer, same reference numerals will be used to describe like components.

In FIG. 3A, a gate line 101 and a data line 103 may be arranged along transverse and longitudinal directions on a transparent first substrate 110 (in FIG. 3B) to define a pixel area, and a common line 104 may be disposed in parallel with the gate line 101. In addition, a pixel electrode line 114 may be provided to overlap the common line 104. Accordingly, the common line 104 and the pixel electrode line 114 may form a storage capacitor using an organic passivation layer 211 as a capacitor dielectric selectively formed on the transparent first substrate 110. The organic passivation layer 211 may be selectively formed at an area where the gate line 101, the data line 103, the common line 104, and the thin film transistor 109 may be disposed, and portions of the organic passivation layer 211 may be removed on the pixel area. Thus, image brightness on a display screen may be improved.

In FIG. 3A, common electrodes 206 may be formed to vertically branch from the common line 104 and the pixel electrodes 107 may be formed to vertically branch from the pixel electrode line 114, wherein the common and pixel electrodes 206 and 107 may be alternatingly arranged within the pixel area.

In FIG. 3B, the common and pixel electrodes 206 and 107, except for the common electrode 206 disposed along an outer portion of the pixel area, may be formed on the gate insulating layer 108 that may have been formed along an entire surface of the transparent first substrate 110. Accordingly, the common and pixel electrodes 206 and 107 may generate a lateral electric field within the pixel area.

Portions of the common electrodes 206 formed along the outer portion of the pixel area that overlap with portions of the data line 103 may be formed on the organic passivation layer 211, wherein the organic passivation layer 211 may electrically insulate the common electrode 206 and the data line 103. In addition, a first alignment layer 112a may be formed along an entire surface of the transparent first substrate 110 including the common and pixel electrodes 206 and 107.

In FIG. 3B, a black matrix 121, which may prevent light from leaking into the TFT 109, a color filter 123, and a second alignment layer 112b may be formed on a transparent second substrate 120. In addition, a liquid crystal layer 113 may be provided between the transparent first and second substrates 110 and 120.

Accordingly, the organic passivation layer 211 may be formed only within areas exclusive of the pixel area (i.e., the gate line 101, the data line 103, the common line 104, and the TFT 109), wherein loss of light produced by a backlight device and generated onto a light transmission area (i.e., pixel area) may be prevented. However, as shown in FIG. 3B, since the organic passivation layer 211 may be selectively formed within the area of the gate line 101, the data line 103, the common line 104, and the thin film transistor 109, a stepped portion 200 may be formed along an edge portion of the pixel area. Accordingly, alignment of the liquid crystal molecules may not be properly achieved due to slanted surfaces of the stepped portion 200. Thus, the light may leak along the stepped portion 200, thereby lowering image quality.

Figure 4A:
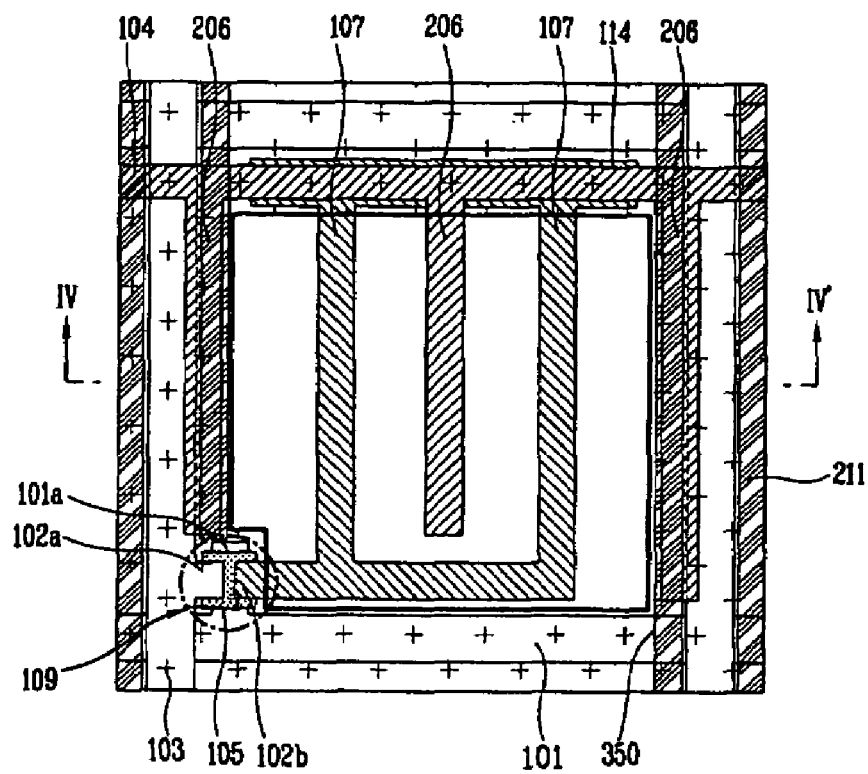
FIG. 4A is a plan view of another exemplary unit pixel of an in-plane switching mode LCD device according to the present invention.
Figure 4B:
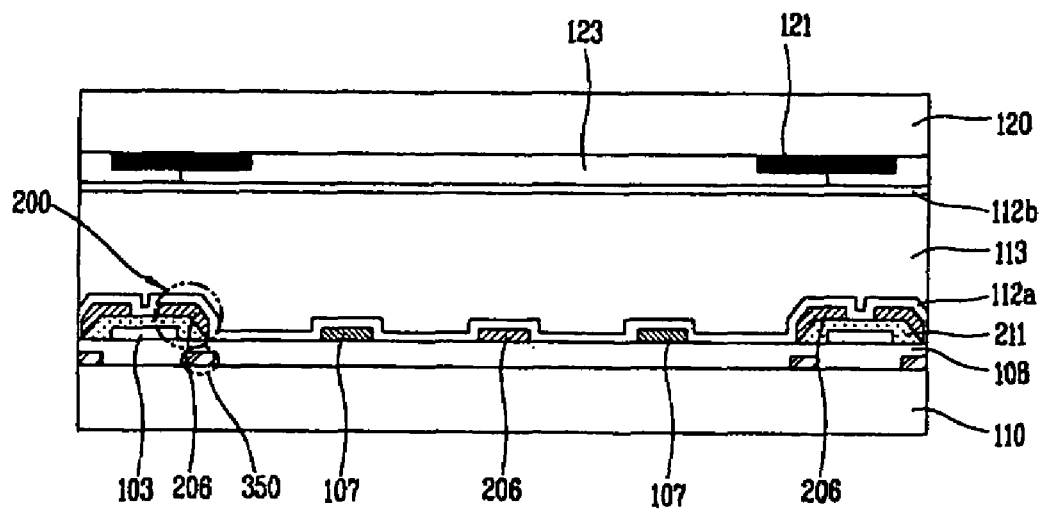
FIG. 4B is a cross sectional view along IV-IV' of FIG. 4A according to the present invention.

FIG. 4A is a plan view of another exemplary unit pixel of an in-plane switching mode LCD device according to the present invention, and FIG. 4B is a cross sectional view along IV-IV' of FIG. 4A according to the present invention. In FIGS. 4A and 4B, since all components, except a light blocking system formed on a lower portion of a stepped portion 200 on the organic passivation layer 211, may be the same as those of FIGS. 3A and 3B, similar reference numerals may be used for the same components.

In FIG. 4A, a gate line 101 and a data line 103 may be disposed along transverse and longitudinal directions on a transparent first substrate 110 (in FIG. 4B) to define a pixel area, and a common line 104 may be disposed to be parallel with the gate line 101.

In FIG. 4B, a pixel electrode line 114 may be provided to overlap the common line 104, wherein the common line 104 and the pixel electrode lines 114 may form a storage capacitor using an organic passivation layer 211 as a capacitor dielectric. The organic passivation layer 211 may be selectively formed within an area where the gate line 101, the data line 103, the common line 104, and the thin film transistor 109 are disposed, and may include a slanted stepped portion 200 along an edge portion of the pixel area. In addition, a light blocking line 350 may be formed along a portion of the transparent first substrate 110 that corresponds to the stepped portion 200 in order to block any light that may leak from the stepped portion 200 of the organic passivation layer 211. The light blocking line 350 may be simultaneously with the gate line 101.

In FIG. 4A, common electrodes 206 may be formed to vertically branch from the common line 104 and the pixel electrodes 107 may be formed to vertically branch from the pixel electrode line 114, wherein the common and pixel electrodes 206 and 107 may be disposed to alternate within the pixel area. The common and pixel electrodes 206 and 107, except for the common electrodes 206 disposed along an outer portion of the pixel area, may be formed on a gate insulating layer 108 that may be provided along an entire surface of the transparent first substrate 110. Accordingly, the common and pixel electrodes 206 and 107 may function to generate a lateral electric field within the pixel area.

In FIG. 4A, portions of the common electrode 206 formed along the outer portion of the pixel area may overlap with portions of the data line 103 formed on the organic passivation layer 211, wherein the organic passivation layer 211 may electrically insulate the common electrode 206 and the data line 103. In addition, the first alignment layer 112a is formed on the entire surface of substrate including the common electrode 206 and the pixel electrode 107.

In FIG. 4B, a black matrix 121, which may prevent light from leaking into the TFT 109, a color filter 123, and a second alignment layer 112b may be formed on a transparent second substrate 120. In addition, a liquid crystal layer 113 may be provided between the transparent first and second substrates 110 and 120.

In FIG. 4B, a light blocking line 350 may be formed within an area corresponding to a stepped portion 200 of the organic passivation layer 211, thereby preventing a light leakage on the stepped portion 200. In addition, voltages equal to voltages supplied to the common electrode 206 may be supplied to the light blocking line 350 to form equivalent potentials therebetween. Accordingly, affects of data voltages supplied to the data line 103 toward the pixel electrodes 107 may be effectively shielded.

In general, in order to reduce affects of the data voltage supplied to the data line 103 toward the pixel electrodes 107 in the in-plane switching mode LCD device, the common electrodes 206 are disposed along outer portions of the pixel area adjacent to the data lines 103. However, it may not be possible to completely shield the affects of the data voltages toward the pixel electrodes 107 adjacent to the data line 103. Thus, vertical cross talk may be generated by the affects of the electric field of the data voltages toward the pixel electrodes 107 during driving, thereby lowering image quality.

However, as shown in FIG. 4B, since the light blocking line 350 may be formed on the stepped portion 200, when voltages equal to voltages supplied to the common electrodes 206 are supplied, the common electrode 206 and the light blocking line 350 form equivalent potentials that block the affects of the data voltages supplied to the data line 103 toward the pixel electrodes 107. Thus, a complete lateral electric field may be formed between the common electrodes 206 and the pixel electrodes 107.

Moreover, the pixel electrodes 107 and the common electrodes 206 may be formed on a common plane (i.e., a gate insulating layer), thereby increasing an electric field supplied to the liquid crystal layer between the pixel and common electrodes 107 and 206. Accordingly, the liquid crystal molecules of the liquid crystal layer may be switched more rapidly by the stronger electric field, and may produce moving images.

FIGS. 5A to 5D are plan views of an exemplary method of fabricating an in-plane switching mode LCD device according to the present invention, and FIGS. 6A to 6D are cross sectional views along V-V', VI-VI', VII-VII', and VIII-VIII' of FIGS. 5A to 5D, respectively, showing the exemplary method of fabricating an in-plane switching mode LCD device according to the present invention.

Figure 5A:
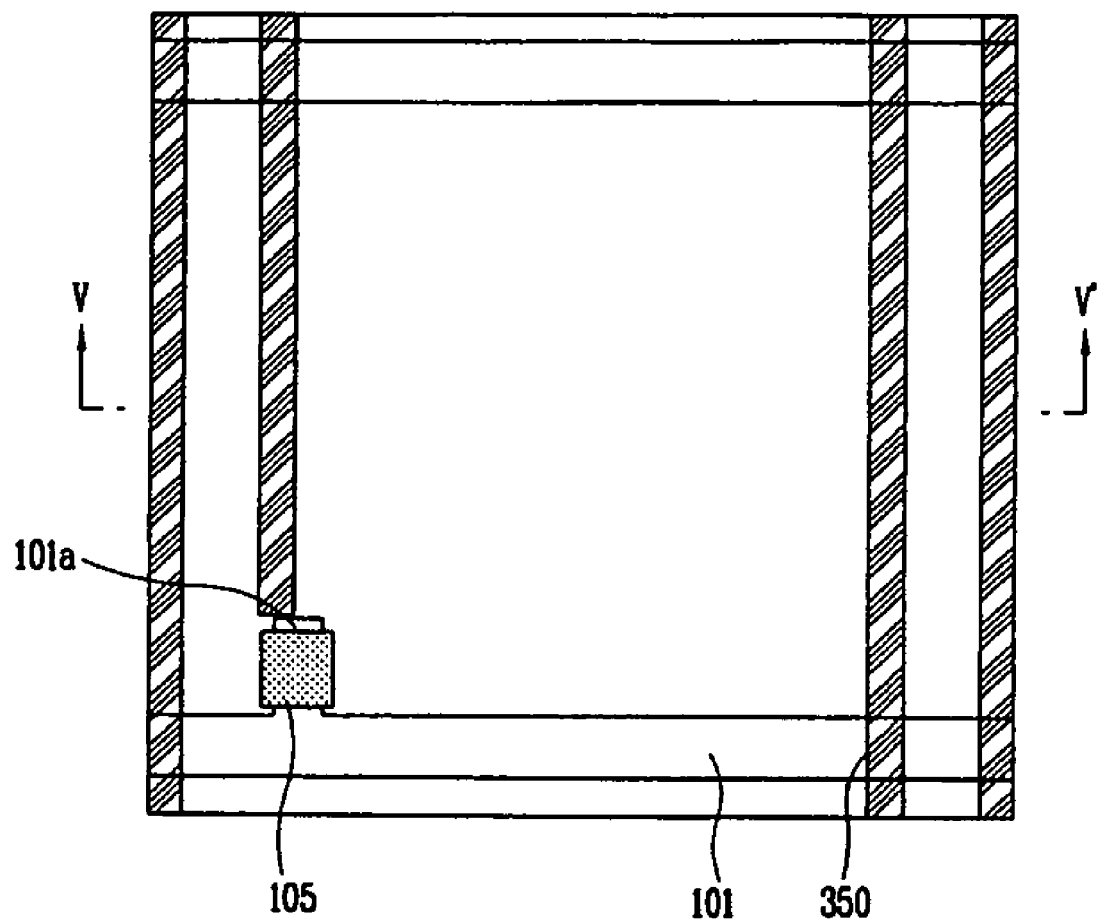
FIGS. 5A to 5D are plan views of an exemplary method of fabricating an in-plane switching mode LCD device according to the present invention.
Figure 6A:
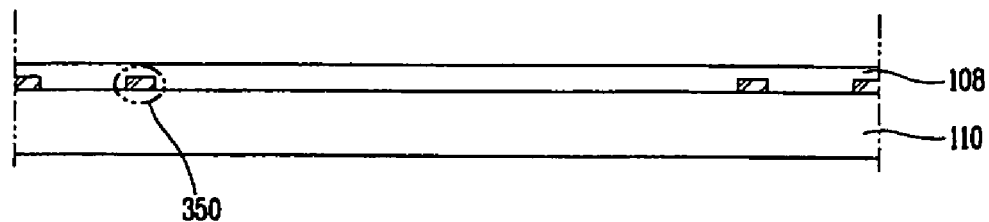
FIGS. 6A to 6D are cross sectional views along V-V', VI-VI', VII-VII', and VIII-VIII' of FIGS. 5A to 5D, respectively, showing the exemplary method of fabricating an in-plane switching mode LCD device according to the present invention.

In FIGS. 5A and 6A, a metal, such as Cu, Ti, Cr, Al, Mo, Ta, and Al alloys, may be deposited and patterned on an insulating substrate 110, such as glass, to form a gate line 101, a gate electrode 101a, and a light blocking line 350, which may be disposed along a vertical direction normal to a direction of the gate line 101. Then, SiNx or SiOx may be deposited using a plasma CVD method along an entire surface of the insulating substrate 110, including the gate line 101 and the light blocking line 350, to form a gate insulating layer 108. Next, amorphous silicon and n+ amorphous silicon may be deposited and patterned on an upper part of the gate insulating layer 108 to form a semiconductor layer 105 on the gate electrode 101a.

Figure 5B:
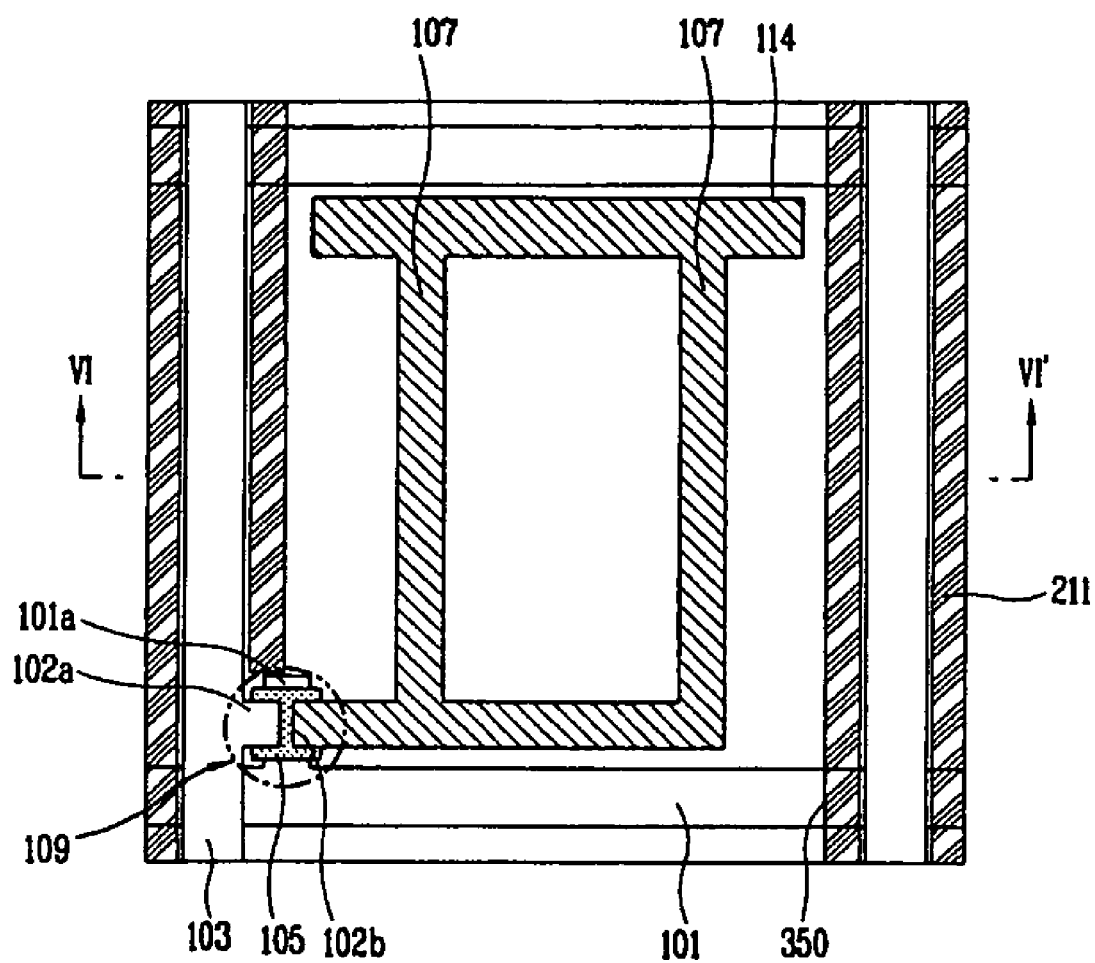
Figure 6B:
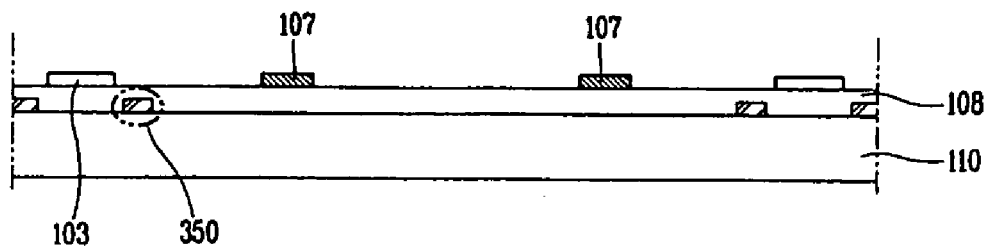

In FIGS. 5B and 6B, a metal, such as Cu, Mo, Ta, Al, Cr, Ti, and Al alloys, may be deposited using a sputtering method and patterned to form a data line 103 parallel with the light blocking line 350, source and drain electrodes 102a and 102b, a pixel electrode line 114 disposed in parallel with the gate line 101, and pixel electrodes 107 that may vertically branch from the pixel electrode line 114, wherein the pixel electrodes 107 may include a portion that is connected to the drain electrode 102b. The pixel area may be defined by cross regions of the gate and data lines 101 and 103 arranged along transverse and longitudinal directions, wherein a thin film transistor 109 including a gate electrode 101a, the semiconductor layer 105, and the source and drain electrodes 102a and 102b may be formed at the cross regions of the gate and data lines 101 and 103.

Figure 5C:
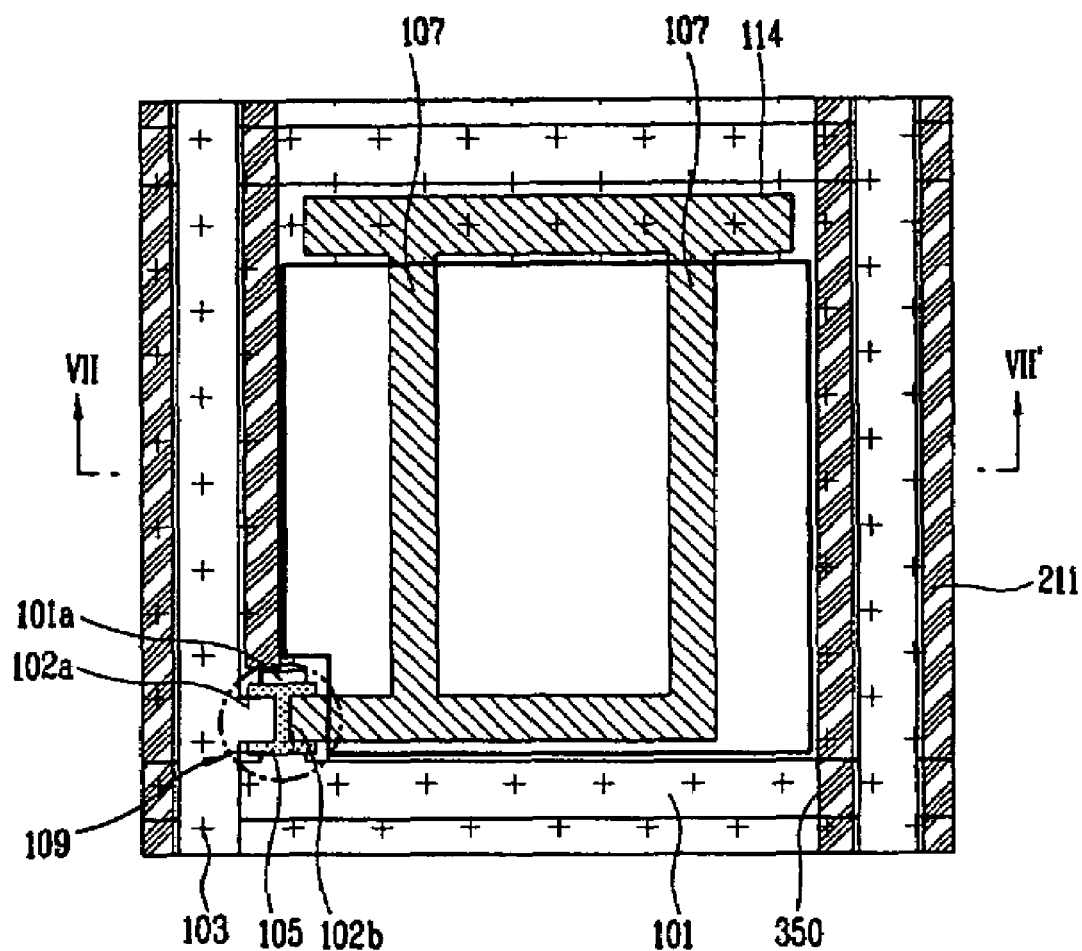
Figure 6C:
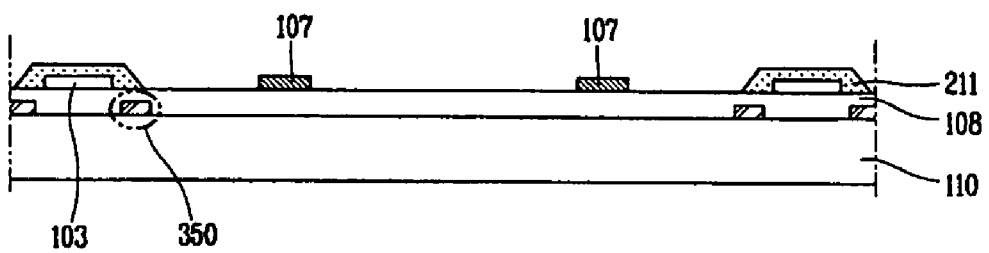

In FIGS. 5C and 6C, an organic material, such as benzocyclobutene or acryl, may be formed along an entire upper portion of the gate insulating layer 108 of a pixel area upon which the thin film transistor 109 and the pixel electrode 107 are formed to form an organic material layer. Then, portions of the organic material layer may be removed to expose portions of the pixel electrodes 107 on the gate insulating layer 108, wherein an organic passivation layer 211 may selectively remain on the gate line 101, the data line 103, the pixel electrode line 114, and the thin film transistor 109.

Figure 5D:
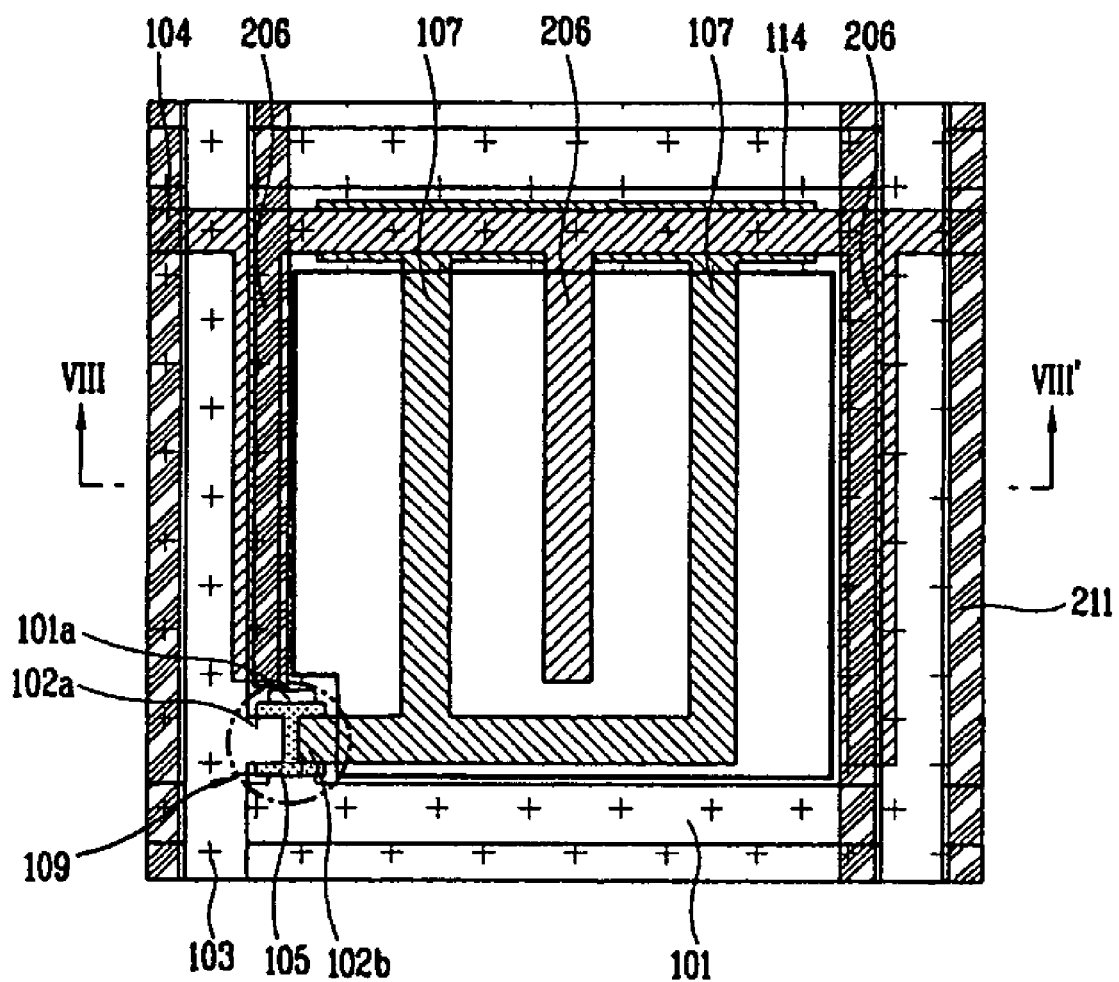
Figure 6D:
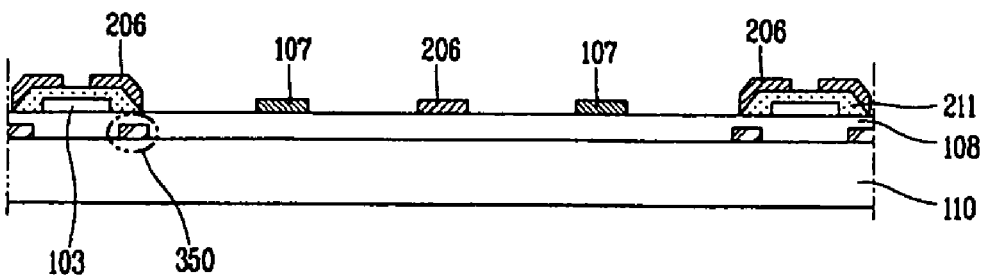

In FIGS. 5D and 6D, transparent material, such as ITO or IZO, may be deposited along an entire surface of the insulating substrate 110 including the pixel electrodes 107. Then, the transparent material may be patterned to form the common line 104 (in FIG. 5D) to overlap with the pixel electrode line 114, wherein common electrodes 206 may vertically branch from the common line 104 for generating a lateral electric field with the pixel electrodes 107 within the pixel area. In addition, portions of the common electrodes 206 disposed along outer portions of the pixel area may be formed to overlap portions of the data line 103.

Then, the insulating substrate 110 and another substrate upon which color filters may be formed may be attached together, and a liquid crystal layer may be provided between the insulating substrate 110 and the another substrate, thereby forming an LCD device.

According to the present invention, an in-plane switching mode LCD device includes removal of a portion of an organic passivation layer formed within a pixel area in order to prevent a decrease in image brightness due to light absorption of the organic passivation layer. Accordingly, a high aperture ratio may be achieved. In addition, a light blocking system is provided at a stepped portion of the organic passivation layer in order to prevent light leakage generated on the stepped portion of the organic passivation layer. Thus, voltages equal to voltages supplied to a common electrode may be supplied to the light blocking system in order to block affects of data voltages supplied to data lines toward pixel electrodes, thereby improving image quality. Moreover, since pixel and common electrodes may be formed within a same plane, switching of liquid crystals may increase, thereby providing rapid display of images (i.e., moving images).

It will be apparent to those skilled in the art that various modifications and variations can be made in the in-plane switching mode liquid crystal display device and method of fabricating and in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
   a gate line and a light blocking line on a first substrate;
   a data line on the first substrate to define a pixel area;
   a plurality of pixel electrodes within the pixel area to be parallel with the data line;
   an organic layer along an entire surface of the first substrate except for the pixel electrodes; and
   a plurality of common electrodes on the first substrate, wherein at least one of the common electrodes is provided along an outer portion of the pixel area to overlap the data line.

2. The device according to claim 1, wherein the common electrodes include at least one of ITO and IZO.

3. A method of fabricating an in-plane switching mode liquid crystal display device, comprising:
   forming a gate line and a light blocking line on a first substrate;

forming a data line on the first substrate to define a pixel area;

forming a plurality of pixel electrodes within the pixel area to be parallel with the data line;

forming an organic layer along an entire surface of the first substrate;

exposing the pixel electrodes by removing a portion of the organic layer; and forming a plurality of common electrodes on the first substrate, wherein at least one of the common electrodes along an outer portion of the pixel area overlap the data line.

4. The method according to claim 3, wherein the common electrodes include at least one of ITO and IZO.

* * * * *